(12) United States Patent
Lu

(10) Patent No.: US 7,410,292 B2
(45) Date of Patent: Aug. 12, 2008

(54) CLINICAL THERMOMETER

(76) Inventor: Hsueh-Yu Lu, 5F-23, 70, Fu-Shing Road, Taoyuan (TW)

( * ) Notice: Subject to any disclaimer, the term of this patent is extended or adjusted under 35 U.S.C. 154(b) by 14 days.

(21) Appl. No.: 11/488,702

(22) Filed: Jul. 19, 2006

(65) Prior Publication Data

US 2008/0019419 A1 Jan. 24, 2008

(51) Int. Cl.
*G01K 1/14* (2006.01)
*G01K 1/16* (2006.01)
*G01K 7/00* (2006.01)

(52) U.S. Cl. .................. 374/163; 374/208; 374/183
(58) Field of Classification Search ............. 374/208, 374/163, 183, 179, 170, 185; D10/57; 600/474, 600/549

See application file for complete search history.

(56) References Cited

U.S. PATENT DOCUMENTS

| | | | |
|---|---|---|---|
| 6,394,648 B1 * | 5/2002 | Tseng | 374/208 |
| 6,676,290 B1 * | 1/2004 | Lu | 374/163 |
| 6,979,122 B2 * | 12/2005 | Yu | 374/208 |
| 7,261,462 B2 * | 8/2007 | Hsieh | 374/208 |
| 2004/0114668 A1 * | 6/2004 | Hsieh | 374/208 |
| 2006/0039446 A1 * | 2/2006 | Lee | 374/208 |
| 2006/0189884 A1 * | 8/2006 | Lussier et al. | 600/549 |
| 2006/0280225 A1 * | 12/2006 | Hayashi et al. | 374/208 |
| 2007/0014330 A1 * | 1/2007 | Hsieh | 374/208 |
| 2007/0025415 A1 * | 2/2007 | Chen | 374/163 |
| 2007/0100253 A1 * | 5/2007 | Sisk et al. | 600/549 |
| 2007/0258506 A1 * | 11/2007 | Schwagerman et al. | 374/179 |

* cited by examiner

Primary Examiner—Gail Verbitsky
(74) Attorney, Agent, or Firm—Troxell Law Office, PLLC

(57) ABSTRACT

A clinical thermometer generally comprises an outer case, a flexible probe stem, a sensor cap, an inner base, an electronic processor, and a temperature sensor. The flexible probe stem has a front junction having several grooves. The inner base, which is made of a rigid material, is embedded into the front junction to almost stuff up its inside to provide it with sufficient strength for tight, secure connection with the sensor cap and make the sensor cap not easy to fall apart.

5 Claims, 5 Drawing Sheets

CLINICAL THERMOMETER

FIELD OF THE INVENTION

The present invention relates to a clinical thermometer, and more particularly to a clinical thermometer having tightly assembled flexible components and sensor cap so that the clinical thermometer provides the preferable flexibility to be adaptable to different available probing space and probing regions.

BACKGROUND OF THE INVENTION

Generally speaking, most electronic clinical thermometers have rigid plastic sheath and may thus hurt the feeble patients. In particular, it is extra dangerous to probe the anus temperate of children.

As disclosed in U.S. Pat. No. 6,379,039, a clinical thermometer is characterized in that a flexible probe stem is connected to a sensor cap. In addition, the probe stem is made of thermoplastic elastomer (TPE) to make the probe stem soft and flexible. However, the soft, flexible probe stem is unable to provide sufficient strength to connect with the sensor cap tightly due to the existence of flexion and deformation.

SUMMARY OF THE INVENTION

It is a main object of the present invention to provide a clinical thermometer comprising a front junction having several grooves. In addition, an inner base, which is made of a rigid material, is embedded into the front junction to provide the front junction with sufficient strength for tight, secure connection with a sensor cap and make the sensor cap not easy to fall apart.

It is another object of the present invention to provide an inner base that allows a temperature-sensing wire to pass therethrough easily, thereby preventing the problem of difficult passage and making the assembling process easy.

DETAILED DESCRIPTION OF THE PREFERRED EMBODIMENT

Figure 1:
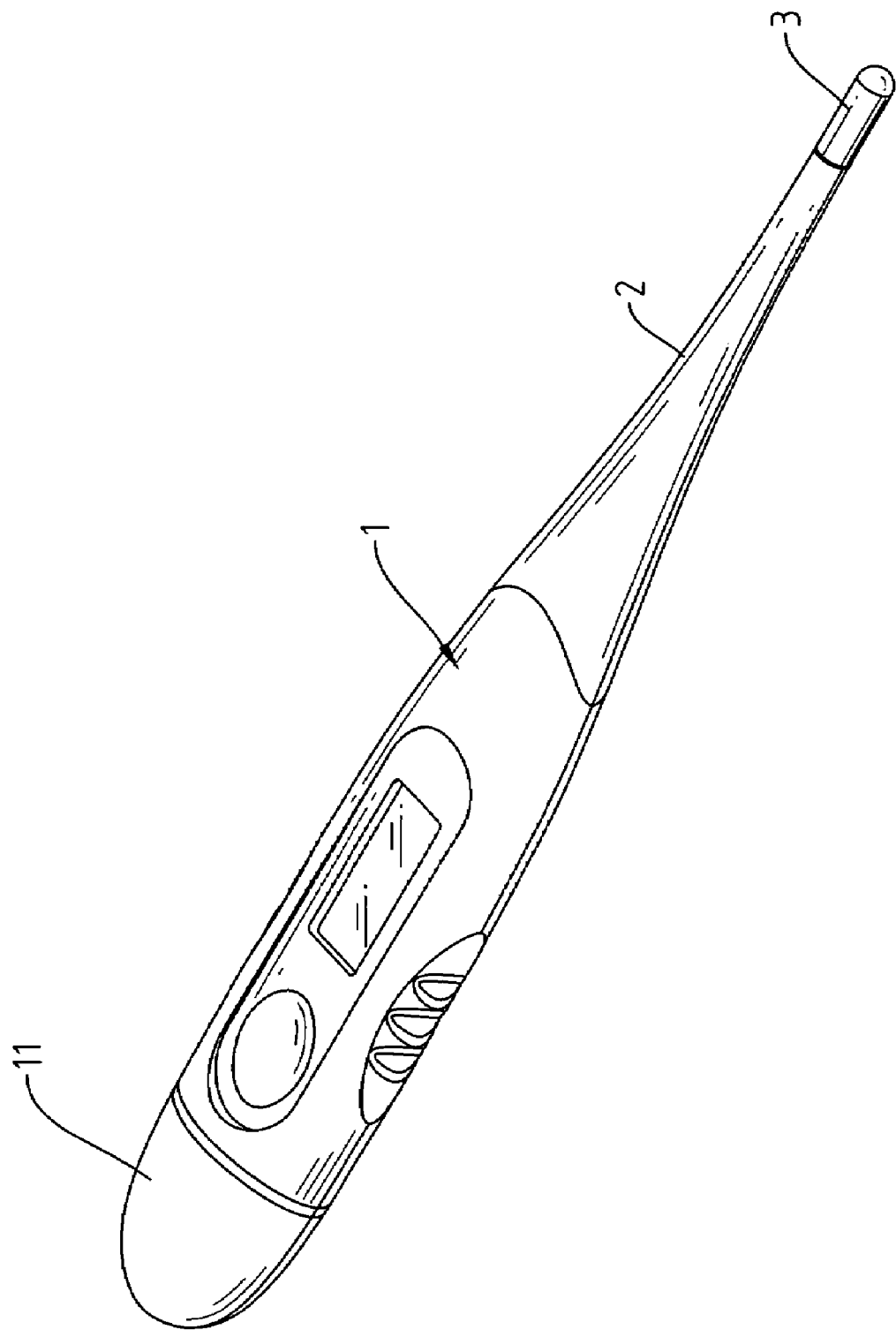
FIG. 1 is an elevational diagram showing a preferred embodiment of the present invention.

Referring to FIGS. 1 through 4, a clinical thermometer of the present invention generally comprises an outer case 1, a flexible probe stem 2, a sensor cap 3, an inner base 4, an electronic processor 5, and a temperature sensor 6.

The aforesaid electronic processor 5 is held inside the outer case 1. A battery cover 11 is detachably attached to the rear end of the outer case 1. The flexible probe stem 2, which has a front junction 21, is integrally formed on the front end of the outer case 1. The flexible probe stem 2 is made of thermoplastic elastomer (TPE) so that the flexible probe stem 2 including the front junction 21 can be soft and flexible. In addition, the inner base 4, which is made of a rigid material, is embedded into the front junction 21 to provide the front junction 21 with sufficient strength for tight, secure connection with the sensor cap 3. As a result, the conventional flexion and deformation problems, which make the flexible probe stem 2 unable to connect with the sensor cap 3 tightly, can be avoided.

The front junction 21 has several toothed grooves 211 on the outer surface. The front junction 21 is fully supported by the rigid inner base 4 that almost stuffs up its inside. The inner base 4 has several depressed trenches 41 on the outside to facilitate the applying of adhesive for tightly adhering to the inner surface of the front junction 21. The above-mentioned inner base 4 further has a slot 42 formed axially on the outside to allow a temperature-sensing wire 61 to pass therethrough easily, thereby preventing the problem of difficult passage. Besides, the temperature-sensing wire 61 and the temperature sensor 6 are positioned by the inner base 4 to allow the temperature sensor 6 to be adhered to the inner surface of the sensor cap 3 easily.

Figure 2:
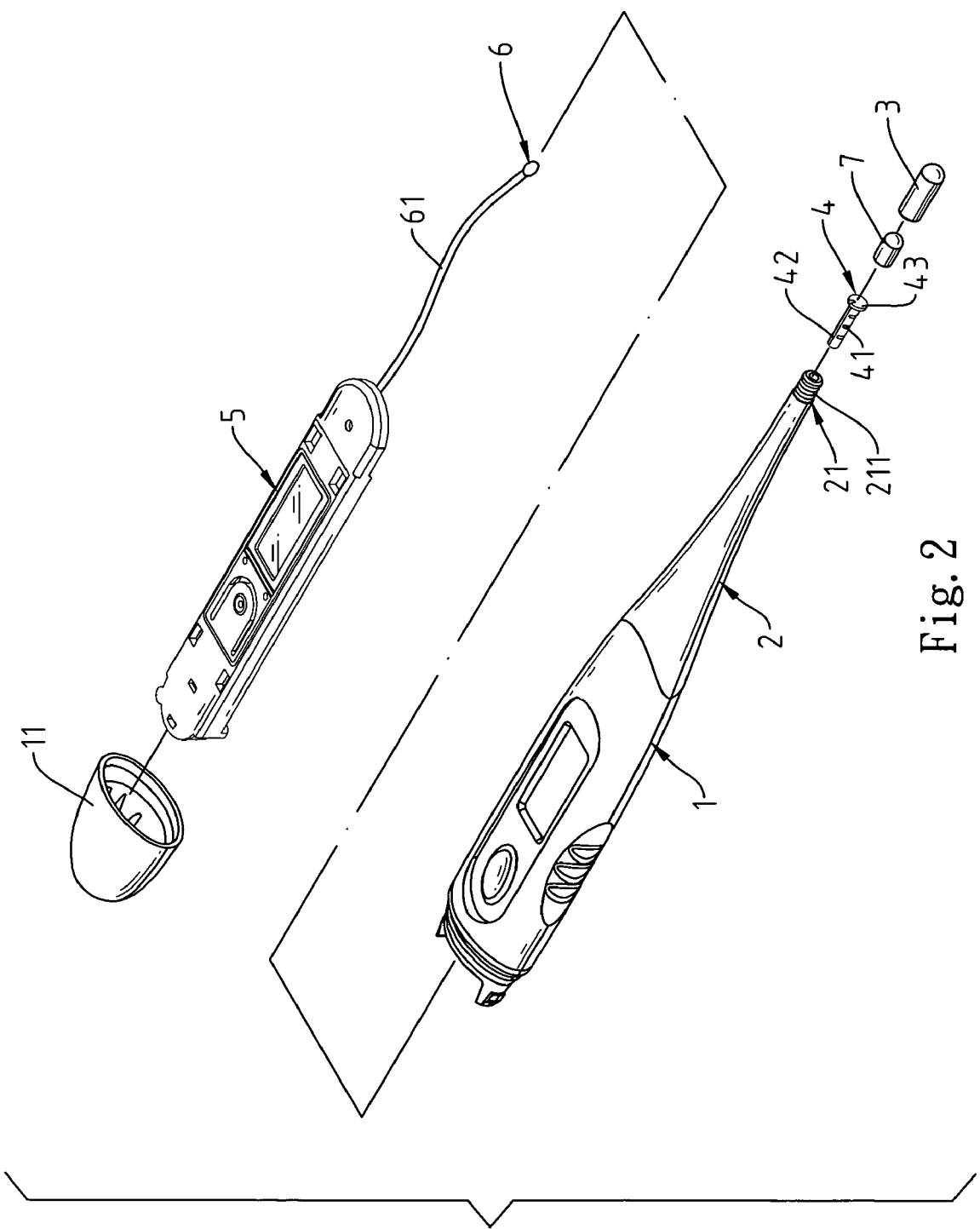
FIG. 2 is an exploded diagram showing the preferred embodiment of present invention.
Figure 3:
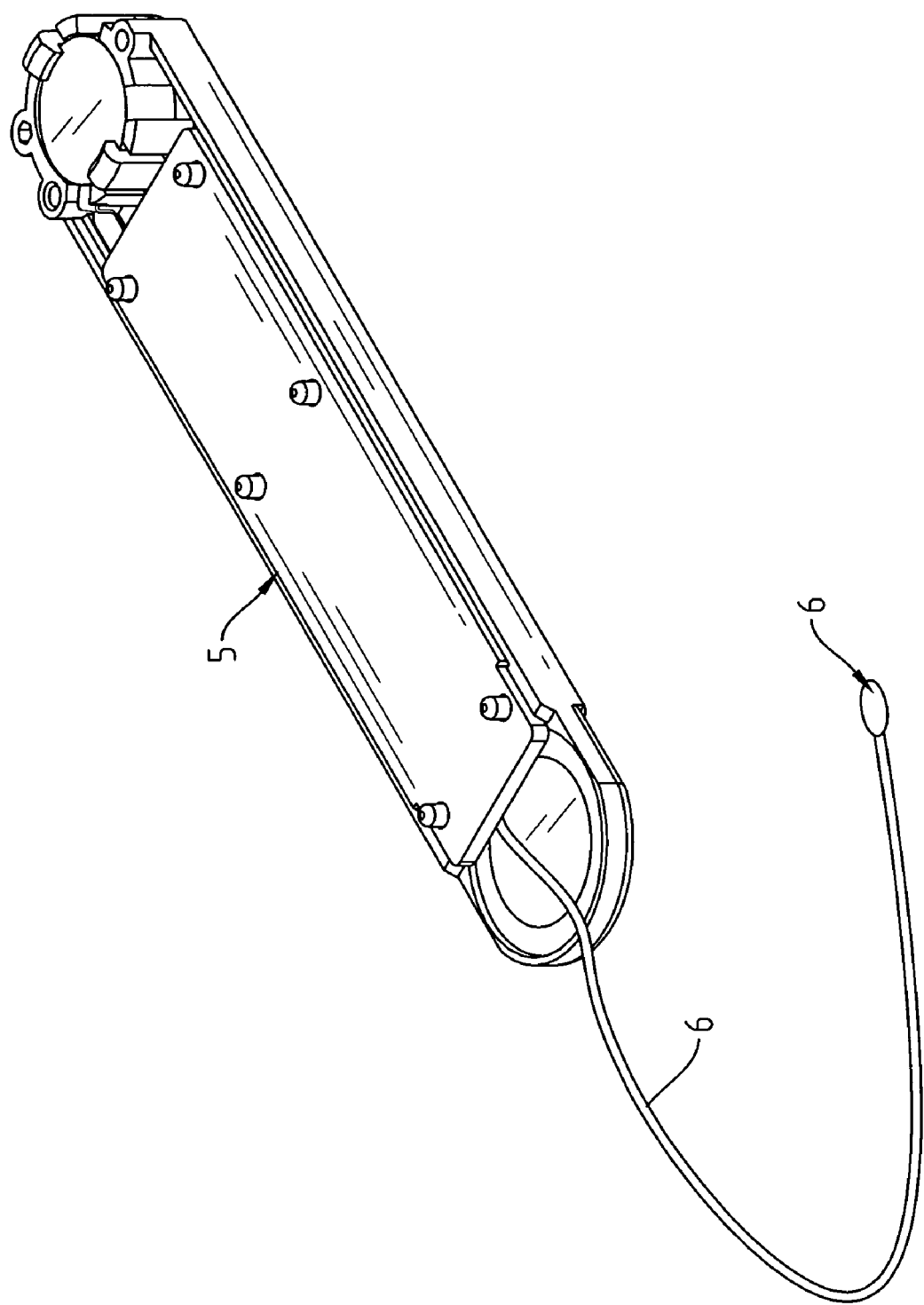
FIG. 3 is an elevational diagram showing the electronic processor in accordance with the preferred embodiment of the present invention.
Figure 4:
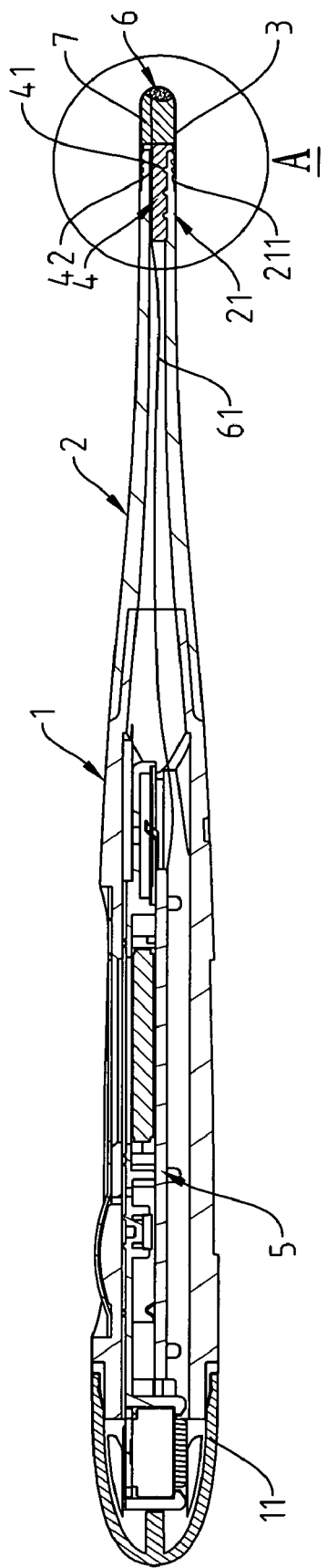
FIG. 4 is a schematic, cross-sectional diagram showing the assembled structure in accordance with the preferred embodiment of the present invention.
Figure 6:
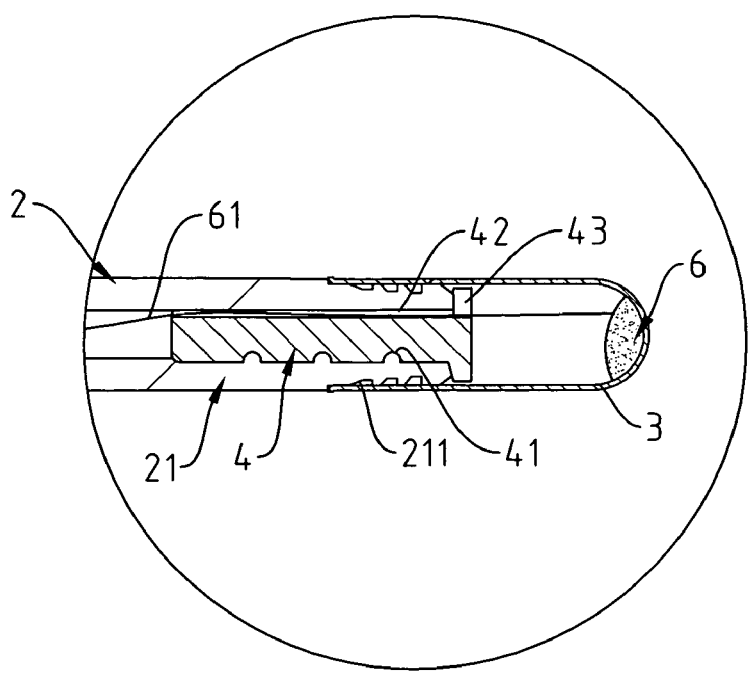
FIG. 6 is a partially enlarged, cross-sectional diagram showing the encircled region A in accordance with another preferred embodiment of the present invention.

Referring further to FIGS. 2, 4, and 6, during the process of assembling the electronic processor 5 to the inside of the outer case 1, the temperature-sensing wire 61 that connects to the electronic processor 5 is first inserted into the slot 42 of the inner base 4, and then the inner base 4 is plugged into the front junction 21. As a result, it is very easy to complete the assembling process. Besides, the inner base 4 has a retaining head 43 having a larger outer diameter to prevent the inner base 4 from being completely embedded into the front junction 21.

Figure 5:
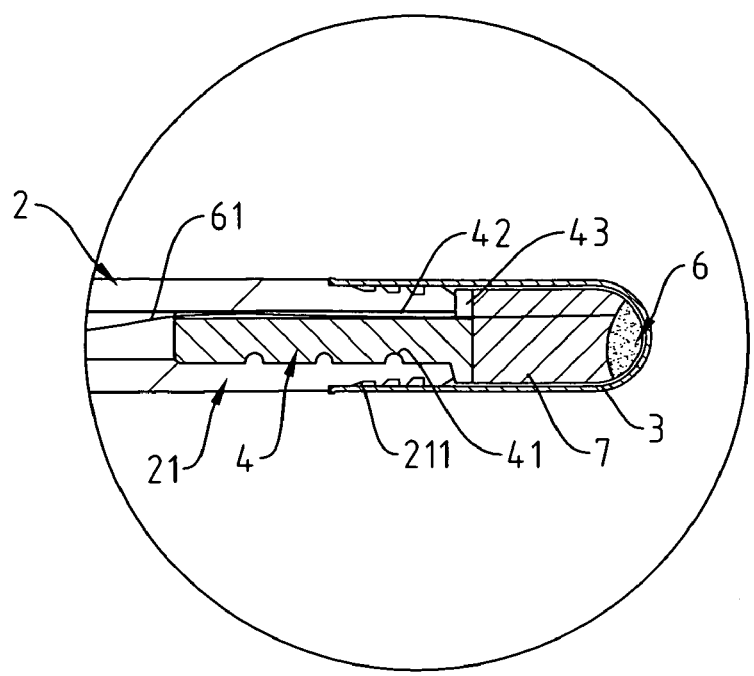
FIG. 5 is a partially enlarged, cross-sectional diagram showing the encircled region A of FIG. 4.

In addition, as shown in FIG. 5, after the insertion of the temperature sensor 6 into the sensor cap 3, a fixing device 7 is optionally plugged into the sensor cap 3 to fix the temperature sensor 6 in the sensor cap 3 more securely. The fixing device 7 is made of expanded polystyrene. Accordingly, the fixing device 7 is able to fix the temperature sensor 6 without interfering with the temperature probing result of the temperature sensor 6.

What the invention claimed is:

1. A clinical thermometer comprising:
    a) an outer case;
    b) an electronic processor located in the outer case;
    c) a temperature sensor having a temperature-sensing wire electrically connecting the temperature sensor to the electronic processor;
    d) a flexible probe stem having a first end extending from an end of the outer case and a front junction located on a second end thereof;
    e) an inner base having:
        i) a first end thereof inserted into the second end of the flexible probe stem;
        ii) a retaining head located on a second end thereof and extending outwardly from the second end of the flexible probe stem, the retaining head preventing the second end of the inner base from being inserted into the flexible probe stem; and
        iii) a slot extending along a length of an exterior thereof, the temperature-sensing wire is inserted through the slot; and f) a sensor cap connected to the front junction of the flexible probe stem and covering the retaining head of the inner base, the temperature sensor is connected to an inner surface of the sensor cap.

2. The clinical thermometer according to claim 1, wherein the inner base is a solid body.

3. The clinical thermometer according to claim 1, wherein the front junction of the flexible probe stem has a plurality of grooves located on an exterior thereof.

4. The clinical thermometer according to claim 1, wherein the retaining head of the inner base has a diameter larger than a diameter of the first end of the inner base.

5. The clinical thermometer according to claim 1, further comprising a fixing device being a material filling a hollow portion of an interior of the sensor cap.

* * * * *